(No Model.)

A. G. CARTER.
FRUIT PITTER.

No. 474,901. Patented May 17, 1892.

Witnesses:

Inventor,
Alexander G. Carter
By Dewey & Co.
Attys

UNITED STATES PATENT OFFICE.

ALEXANDER G. CARTER, OF FRESNO, CALIFORNIA.

FRUIT-PITTER.

SPECIFICATION forming part of Letters Patent No. 474,901, dated May 17, 1892.

Application filed October 19, 1891. Serial No. 409,194. (No model.)

*To all whom it may concern:*

Be it known that I, ALEXANDER G. CARTER, a citizen of the United States, residing at Fresno, Fresno county, State of California, have invented an Improvement in Fruit-Pitters; and I hereby declare the following to be a full, clear, and exact description of the same.

My invention relates to the class of machines for removing the pits or stones from fruit.

It consists, essentially, in the mode or method hereinafter fully described, and also in a novel mechanism by which said mode or method is carried out.

The object of my invention is to provide a simple and effective way and means for extracting fruit-pits, and especially and particularly for removing the pits of clingstone peaches.

Figure 1:
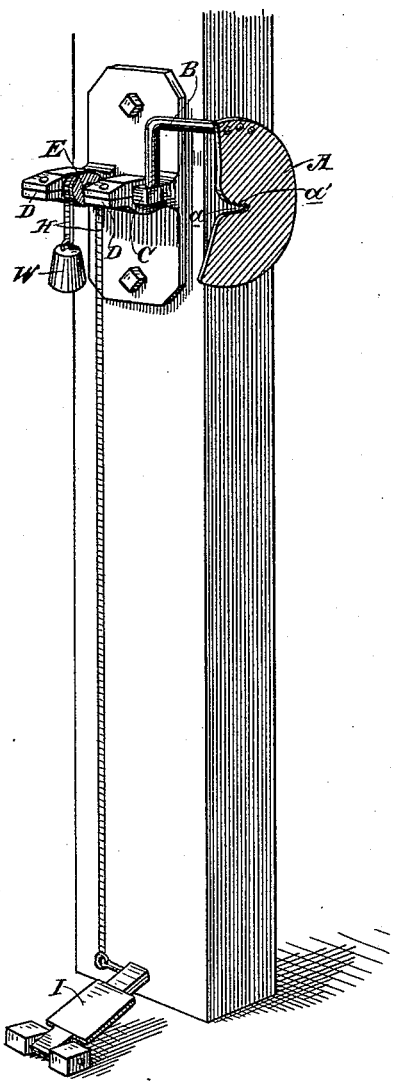
Figure 2:
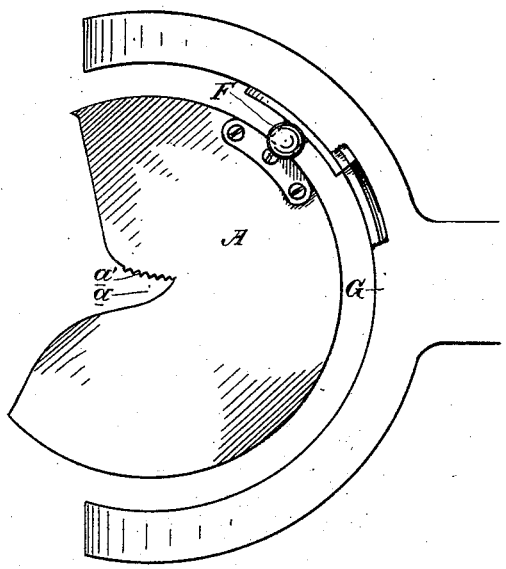

Referring to the accompanying drawings for a more complete explanation of my invention, Figure 1 is a perspective view of my fruit-pitter. Fig. 2 is a view showing a modification in the means for carrying and guiding the holder-plate.

A is the pit-holder. It consists of a plate or disk having a radially-disposed receiving-slot $a$, somewhat enlarged or flaring at its outer end and with its sides ground down to cutting-edges. The inner end of the receiving-slot is suitably shaped to conform to the pit end, and there are prongs or projections $a'$ on one side to engage and hold the pit.

In carrying out my method the fruit is pressed by suitable means, hand or otherwise, into the receiving-slot. It is easily entered, as the mouth of the slot is wide. The sharp edges of the slot cut the flesh of the fruit down to the pit, and when the fruit reaches the inner end or base of the slot the pit is engaged and held rigidly therein, and this engagement is fully insured by the prongs or projections $a'$. When the fruit is in this position, its flesh is separated from the pit by a twisting action. This twist may be imparted by hand or otherwise, and it may be applied either to the flesh or to the pit, or to both. In the first case the flesh of the fruit may be seized, as by the hands, on either side and then given a rotary movement in a plane parallel with the holder-plate. As the pit is firmly held, the two parts of the flesh will be easily twisted from it. In the last case the flesh may be turned in one direction while the pit is turned in the opposite direction, thus twisting them apart; but the preferable way is the second case—namely, holding the flesh stationary and twisting the pit by a rotary or semi-rotary movement. I have accordingly shown the device to accomplish this. The holder-plate is carried upon the end of a crank B of a shaft C, mounted in suitable bearings D and having a pulley E, chain H, treadle I, and return-weight W or other means for rotating it.

In operation the flesh of the fruit is grasped by the hands or by other suitable holders and held stationary. Then the shaft being rotated or partially rotated, the holder-plate is also rotated, and this carrying the pit around with it effectively twists it from the flesh, the two parts of which may then be separated and the pit which remains in the receiving-slot may be knocked out. The rotation of the holder-plate may be a complete one or only a partial or vibratory movement. In either case it is sufficient to cause the sharp edges of the receiving-slot to cut around the remainder of the flesh left uncut when the fruit is pressed into place.

It is best in rotating the holder that it shall move around the axis or center of the fruit, so that the latter can remain in one place, thereby permitting it to be held better. It is not possible to mount the holder-plate directly centrally both because the fruit must be there in the receiving-slot and because the shaft would be in the way of whatever was holding the fruit. Therefore some connection must be made with the holder, which is outside of its axial line and far enough outside to not interfere with the hands or other means for holding the fruit. The crank B, which I have here shown, is of this character, and being simple is preferred, though I do not confine myself to this construction, as other forms may be used—such, for example, as is shown in Fig. 2, wherein a radially-extending arm F is guided and moved in a curved slide or guide G.

It will be seen from the foregoing that my mode or method has for its basis the holding of the pit and its severance from the flesh by a twisting action gained by a rotary or partially rotary movement imparted to the flesh while the pit is held stationary or to the pit while the flesh is held stationary, or to both flesh and pit in opposite directions. This method, while applicable to various fruits, is especially serviceable in stoning clingstone peaches, as it will take the flesh off quite easily and leave but little on the pit.

Having thus described my invention, what I claim as new, and desire to secure by Letters Patent, is—

1. The mode or method of removing pits or stones from fruit, which consists in placing the fruit in a holder which engages the pit or stone, then holding the flesh, and finally separating the flesh from the pit or stone by twisting the one from the other, substantially as herein described.

2. The mode or method of removing pits or stones from fruit, which consists in placing the fruit in a holder which engages the pit or stone, turning said pit or stone by a rotary movement of the holder, and holding the flesh of the fruit stationary during the turning of the pit or stone, whereby the latter is twisted from the flesh, substantially as herein described.

3. In a fruit-pitter, the rotatable pit or stone engaging and holding plate having a receiving-slot for the fruit, substantially as herein described.

4. In a fruit-pitter, the pit or stone engaging and holding plate having a receiving-slot for the fruit, said slot being formed with holding prongs or projections at its inner portion, substantially as herein described.

5. In a fruit-pitter, the rotatable pit or stone engaging and holding plate having a receiving-slot for the fruit, said slot being formed with cutting-sides to cut the flesh of the fruit, substantially as herein described.

6. In a fruit-pitter, the pit or stone engaging and holding plate having a receiving-slot for the fruit, said slot being formed with cutting-sides to cut the flesh and with prongs or projections at its inner portion to better hold the pit, substantially as herein described.

7. In a fruit-pitter, the rotary holding-plate having a receiving-slot for holding the fruit in the axis of rotation, substantially as herein described.

8. In a fruit-pitter, the rotary holding-plate having a receiving-slot for holding the fruit in the axis of rotation and provided with sharp edges to cut the flesh of the fruit, substantially as herein described.

9. In a fruit-pitter, the rotary holding-plate having a receiving-slot for holding the fruit in the axis of rotation and a connection with said plate outside of its center to rotate it, substantially as herein described.

10. In a fruit-pitter, the combination of the plate having the receiving-slot for engaging the pit of the fruit and holding the latter in the axis of rotation, and the rotary shaft having the crank connected with the plate outside of its center, substantially as herein described.

11. In a fruit-pitter, the combination of the plate having the radially-disposed receiving-slot with wide mouth, sharp sides, and prongs or projections at its inner portion, and the rotary shaft having the crank connected with and carrying the plate, substantially as herein described.

In witness whereof I have hereunto set my hand.

A. G. CARTER.

Witnesses:
S. H. NOURSE,
H. F. ASCHECK.